United States Patent
Urbanek

(12) 
(10) Patent No.: US 6,291,756 B1
(45) Date of Patent: Sep. 18, 2001

(54) METHOD AND APPARATUS FOR ENCODING MUSIC INTO SEVEN-BIT CHARACTERS THAT CAN BE COMMUNICATED IN AN ELECTRONIC MESSAGE

(75) Inventor: Scott Andrew Urbanek, Keller, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/580,739

(22) Filed: May 27, 2000

(51) Int. Cl.$^7$ ................................................. G09B 15/02
(52) U.S. Cl. ............................................................. 84/477 R
(58) Field of Search ........................... 84/477 R, 478; 434/307 A

(56) References Cited

U.S. PATENT DOCUMENTS 5,153,829 * 10/1992 Furuya et al. .................. 84/477 R X
5,834,671 * 11/1998 Phoenix .......................... 84/477 R X

* cited by examiner

Primary Examiner—Stanley J. Witkowski
(74) Attorney, Agent, or Firm—Charles W. Bethards; R. Louis Breeden

(57) ABSTRACT

A method of transmitting an electronic message with a musical attachment including encoding music into characters having a length equal to seven bits. Each character represents one of a note, a note extension or a command. Further, pitch changes and duration changes are made in a single character. The encoded music can be attached to an alphanumeric electronic message and transmitted with the attached encoded music.

20 Claims, 3 Drawing Sheets

| 7-BIT CHARACTER | $D_6$ | $D_5$ | $D_4$ | $D_3$ | $D_2$ | $D_1$ | $D_0$ |
|---|---|---|---|---|---|---|---|
| NOTE | $d_1$ | $d_0$ | $o_0$ | $p_3$ | $p_2$ | $p_1$ | $p_0$ |
| NOTE EXTENSION | $d_1$ | $d_0$ | $m_0$ | 1 | 1 | 1 | 0 |
| COMMAND | $c_2$ | $c_1$ | $c_0$ | 1 | 1 | 1 | 1 |

| 7-BIT CHARACTER | $D_6$ | $D_5$ | $D_4$ | $D_3$ | $D_2$ | $D_1$ | $D_0$ |
|---|---|---|---|---|---|---|---|
| NOTE | $d_1$ | $d_0$ | $o_0$ | $p_3$ | $p_2$ | $p_1$ | $p_0$ |
| NOTE EXTENSION | $d_1$ | $d_0$ | $m_0$ | 1 | 1 | 1 | 0 |
| COMMAND | $c_2$ | $c_1$ | $c_0$ | 1 | 1 | 1 | 1 |

| $d_1$ | $d_0$ | DURATION |
|---|---|---|
| 0 | 0 | HALF NOTE |
| 0 | 1 | QUARTER NOTE |
| 1 | 0 | EIGHT NOTE |
| 1 | 1 | SIXTEENTH NOTE |

| $P_3$ | $P_2$ | $P_1$ | $P_0$ | PITCH |
|---|---|---|---|---|
| 0 | 0 | 0 | 0 | C |
| 0 | 0 | 0 | 1 | C# |
| 0 | 0 | 1 | 0 | D |
| 0 | 0 | 1 | 1 | D# |
| 0 | 1 | 0 | 0 | E |
| 0 | 1 | 0 | 1 | F |
| 0 | 1 | 1 | 0 | F# |
| 0 | 1 | 1 | 1 | G |
| 1 | 0 | 0 | 0 | G# |
| 1 | 0 | 0 | 1 | A |
| 1 | 0 | 1 | 0 | A# |
| 1 | 0 | 1 | 1 | B |
| 1 | 1 | 0 | 0 | REST |
| 1 | 1 | 0 | 1 | ALTERNATE |

| $c_2$ | $c_1$ | $c_0$ | COMMAND | DESCRIPTION |
|---|---|---|---|---|
| 0 | 0 | 0 | EXTENDED COMMAND | THE FOLOWING 7 BITS SHOULD BE INTERPRETED AS A COMMAND. |
| 0 | 0 | 1 | OCTAVE SHIFT DOWN | SHIFT THE ACTIVE OCTAVE PAIR DOWN BY ONE OCTAVE. |
| 0 | 1 | 0 | OCTAVE SHIFT UP | SHIFT THE ACTIVE OCTAVE PAIR UP BY ONE OCTAVE. |
| 0 | 1 | 1 | DURATION SHIFT LONGER | DOUBLE THE DURATION OF ALL NOTES. |
| 1 | 0 | 0 | DURATION SHIFT SHORTER | HALVE THE DURATION OF ALL NOTES. |
| 1 | 0 | 1 | STACCATO MODE TOGGLE | TOGGLE STACCATO MODE ON/OFF (DEFAULT IS ON). |
| 1 | 1 | 0 | RESERVED | RESERVED. |
| 1 | 1 | 1 | END OF MUSIC | THIS IS USED TO SIGNAL THE END OF THE EMBEDDED MUSIC. |

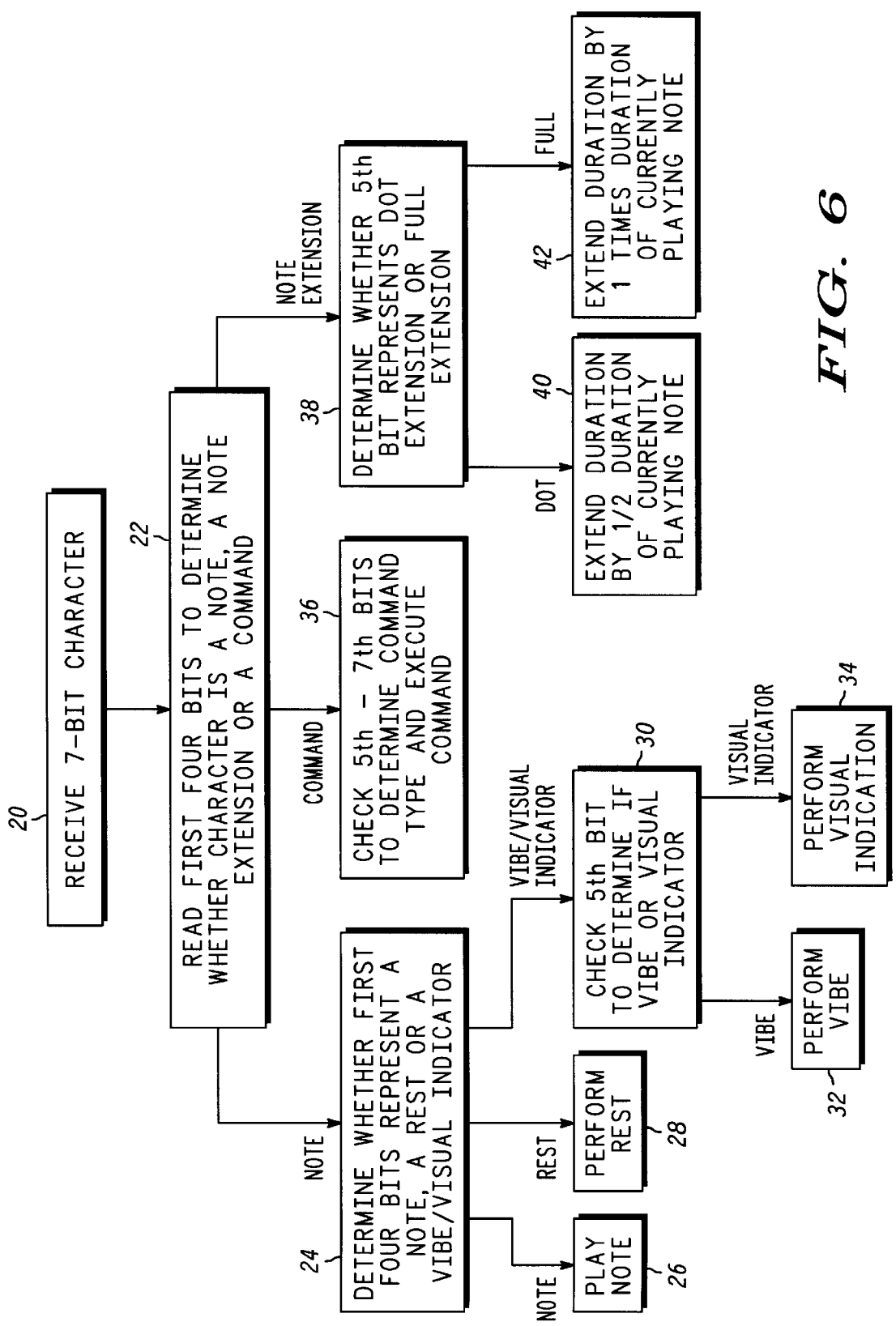

METHOD AND APPARATUS FOR ENCODING MUSIC INTO SEVEN-BIT CHARACTERS THAT CAN BE COMMUNICATED IN AN ELECTRONIC MESSAGE

FIELD OF THE INVENTION

The present invention relates to encoding music into characters to embed the music in an alphanumeric message, where the music can be played upon reading the message.

BACKGROUND OF THE INVENTION

With the increasing popularity of handheld messaging devices such as cellular telephones, pagers, personal digital assistants, etc., consumers are looking for a more "multimedia" experience. Music is a popular form of multimedia. Therefore, it is desirable to embed musical content into alphanumeric messages so that the music can be heard while reading the messages. However, existing formats such as mp3, wav, midi, etc., require sending massive amounts of data to devices which may not even be capable of reproducing those sounds.

Accordingly, it is desirable to encode musical content into a format that is flexible, efficient and which permits almost any device to reproduce basic musical compositions. This is accomplished by embedding musical content into an alphanumeric message so that the music can be played when the message is read or to alert a user that a message has arrived. Further, it is desirable to provide a method where both pitch and duration changes can be made in a single 7-bit character.

BRIEF DESCRIPTION OF THE DRAWINGS

The features of the present invention that are believed to be novel are set forth with particularity in the appended claims. However, the invention together with further advantages thereof, may be best understood by reference to the accompanying drawings wherein:

FIG. 4 is a table showing encoding of musical notes according to an embodiment of the present invention.

FIG. 5 is a table showing encoding of commands according to an embodiment of the present invention.

FIG. 6 is a flow chart showing a process by which music is decoded according to an embodiment of the present invention.

DETAILED DESCRIPTION OF THE INVENTION

Figures 1, 2, 3:
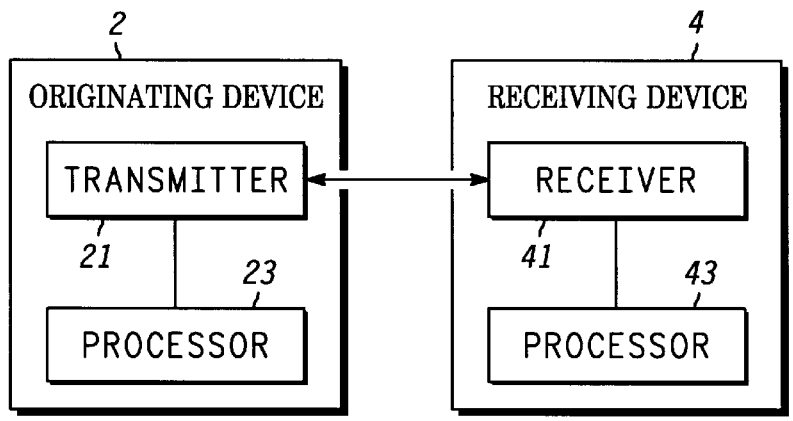
FIG. 1 is a diagram of a system to transmit and receive music in an alphanumeric message according to an embodiment of the present invention.
FIG. 2 is a table showing encoding of music according to an embodiment of the present invention.
FIG. 3 is a table showing encoding of durations according to an embodiment of the present invention.

FIG. 1 is a diagram of a system to transmit and receive music in an alphanumeric message according to an embodiment of the present invention. Referring to FIG. 1, an originating device 2 preferably transmits electronic messages to a receiving device 4. Originating device 2 may be any device capable of transmitting an electronic message such as a computer, a personal digital assistant, a pager or a cellular telephone, etc. Receiving device 4 may be any device capable of receiving and displaying an electronic message, such as a computer, a personal digital assistant, a pager or a cellular telephone, for example.

Preferably, originating device 2 is capable of encoding music into the electronic message in accordance with the present invention and comprises a transmitter 21 arranged to transmit the messages and a processor coupler thereto for providing the messages. Alternatively, the music may be encoded in a separate device and merely transmitted from originating device 2 to receiving device 4. Typically, an alphanumeric message transmitted from originating device 2 to receiving device 4 will be embedded with the music which is encoded into characters of 7 bits in length. Since preferably the music received with a specific message is stored as part of that message, every message received by receiving device 4 may have its own unique musical attachment. In any event the devices comprises a receiver 41 arranged to receive the messages and a processor 43 coupled thereto operating to decode the message and play the music.

It is understood that the processors in device 2 and device 4 are preferably executing software (firmware) instructions so as to operate in accordance with the teachings herein. In view of these teachings, providing such software would be well within the wherewithal of one of ordinary skill in the art and thus no further discussion is provided by this disclosure.

FIG. 2 is a table showing encoding of music according to an embodiment of the present invention. Referring to FIG. 2, the music is preferably encoded into characters of 7 bits in length, $D_6$–$D_0$. Each character preferably represents either a note, a note extension or a command.

Each note contains duration $d_x$, octave $o_y$ and pitch information $P_z$. The duration information is used to specify whether the note is a half, quarter, eighth or sixteenth note. Other note durations can be specified by using note extensions or a duration shift command, as explained later. As seen in FIG. 2, bits $d_1$, and $d_0$ represent the various durations.

At all times, receiving device 4 will preferably maintain two octaves, a lower octave and an upper octave, which preferably can be selected using the octave information in the note character. When other octaves are necessary, an octave shift preferably can be executed using the octave shift commands to be explained later. As seen in FIG. 2, the bit, $D_4$, is the bit typically used to indicate the octave level if bits $D_0$–$D_3$ indicate that the character is a note (rather than a note extension or a command).

Note extensions are characters which preferably extend the duration of the currently playing note. Note extensions are requested by setting $D_3$–$D_0$ to 0XE (Hex $E_1$ 1110 as seen in FIG. 2).

FIG. 3 is a table showing encoding of durations according to an embodiment of the present invention. Referring to FIG. 3, if bit $d_0$ is low and bit $d_1$, is low, the duration is a half note. If $d_0$ is high and $d_1$, is high, the duration is a sixteenth note, etc.

FIG. 4 is a table showing encoding of musical notes according to an embodiment of the present invention. Referring to FIG. 4, the pitch information allows the actual note to be selected. These notes include any of the twelve notes in an octave, a rest, a vibe (Alternate with $o_0$ low or zero, see $D_4$ in FIG. 2), or a visual indicator (Alternate with $o_0$ high or one, see $D_4$ in FIG. 2). A vibe will cause receiving device 4 to vibrate for a specified duration. A visual indicator is typically device specific and may include illuminating a back light of receiving device 4 or illuminating a light emitting diode on receiving device 4 for a specified duration when a visual indicator is executed.

As seen in FIG. 4, if the character is a note, the first four bits preferably indicate either which of the twelve notes is to be played, whether a rest is to be executed, or whether a vibe or a visual indicator are to be executed.

FIG. 5 is a table showing encoding of commands according to an embodiment of the present invention. Referring to FIG. 5, commands are used to cause a music engine (not shown) in receiving device 4 to perform certain tasks. Examples of such tasks include shifting active octaves, changing the tempo (duration shifts) and stopping the music. Setting the commands bits to low indicates an extended command which instructs the music engine to interpret the next 7-bit character as a command. Commands are specified by setting bits $D_3$–$D_0$ to 0XF (HexF, 1111 as seen in FIG. 2).

FIG. 6 is a flow chart showing a process by which music is decoded according to an embodiment of the present invention. Referring to FIG. 6, in operation 20, receiving device 4 receives a 7-bit character.

From operation 20, the process moves to operation 22, where the first four bits ($D_0$–$D_3$) are read to determine whether the character is a note, a note extension or a command.

If the first four bits indicate that the character is a note, the process moves from operation 22 to operation 24, where it is determined whether the first four bits represent a note, a rest or a vibe/visual indicator.

If the first four bits indicate that the character is a note, the process moves from operation 24 to operation 26, where the appropriate note is played. If the first four bits indicate that the character is a rest, the process moves from operation 24 to operation 28, where a rest is executed.

If the first four bits indicate that the character is either a vibe or a visual indicator, the process moves from operation 24 to operation 30, where the fifth bit ($D_4$) is checked to determine whether the character is a vibe or a visual indicator.

If $D_4$ is low, the character is a vibe. If $D_4$ is high, the character is a visual indicator.

If $D_4$ is low, the process moves from operation 30 to operation 32, where a vibe is performed. If $D_4$ is high, the process moves from operation 30 to operation 34, where a visual indication is performed.

If in operation 22 the first four bits indicate that the character is a command, the process moves from operation 22 to operation 36, where the fifth through seventh bits ($D_4$–$D_6$) are checked to determine the command type (see FIG. 5) and the corresponding command is executed. If in operation 22 the first four bits indicate that the character is a note extension, the process moves from operation 22 to operation 38, where the fifth bit ($D_4$) is checked to determine whether the note extension is a dot extension or a full extension. If $D_4$ is high, the process moves from operation 38 to operation 40, where the duration of the currently playing note is extended by one-half of the duration of the currently playing note.

If $D_4$ is low, the process moves from operation 38 to operation 42, where the duration of the currently playing note is extended by one times the duration of the currently playing note.

By the above-described process, the encoded music can be decoded and preferably played when the message is read. Alternatively, the music can be played by receiving device 4 as an alert that the message has arrived.

It will be appreciated by those skilled in the art that the present invention has many practical applications. For example, an advertisement based service, which relies on transmitting advertisements to receiving devices to offset the cost of its service may transmit these advertisements with music embedded therein, such as a company's jingle. Another example includes attaching musical call signs for information service providers. For example, if a service provider provides a user carrying a receiving device with news updates, these updates can be accompanied by music embedded in the message. Alternatively, the user can be alerted to the incoming message by the music embedded in the message. Another example includes a user-selectable musical signature such that any time a receiving device receives a message from that user, the receiving device is alerted that a message has arrived from that particular user when the user-selectable musical signature is played.

While several examples of practical uses of the present invention have been described herein, it will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A method of embedding musical content into an electronic message, comprising in an originating device the step of:

encoding music into characters having a length equal to seven bits, wherein the characters represent notes, note extensions, and commands, there by creating encoded music; and transmitting an alphanumeric message embedded with the encoded music; and further comprising in a receiving device the steps of:
decoding the alphanumeric message; and playing the music.

2. The method as claimed in claim 1, wherein the encoding step comprises the step of making pitch changes and duration changes in a single pitch character.

3. The method as claimed in claim 1, wherein the encoding step comprises the step of including in each note information defining duration, octave and pitch.

4. The method as claimed in claim 3, further comprising the step of defining the duration to be one of a ½ note, a ¼ note, a ⅛ note or a 1/16 note.

5. The method as claimed in claim 3, further comprising the step of selecting a lower octave or a higher octave.

6. The method as claimed in claim 1, wherein a note extension is a character which extends a duration of a currently playing note.

7. The method as claimed in claim 6, wherein the note extension is one of a dot extension or a full extension.

8. The method as claimed in claim 7, wherein the dot extension extends a currently playing note by one half of the duration of the currently playing note.

9. The method as claimed in claim 7, wherein the full extension extends the currently playing note by one times the duration of the currently playing note.

10. The method as claimed in claim 1, wherein a command is used to cause a music engine to perform a predetermined task.

11. The method as claimed in claim 10, wherein the predetermined task includes shifting active octaves, changing a tempo and stopping the music.

12. The method as claimed in claim 1, further comprising the step of transmitting a user-selectable musical signature with the electronic message from the originating device to the receiving device, wherein the user-selectable musical signature is played by the receiving device when the receiving device receives the electronic message.

13. The method as claimed in claim 1, further comprising the steps of:

transmitting the electronic message to the receiving device; and playing the music when the message is received by the receiving device.

14. A method of transmitting an electronic message with a musical attachment, comprising the steps of:

encoding music into characters having a length equal to seven bits, wherein the characters represent notes, note extensions, and commands, thereby creating encoded music;

attaching the encoded music to an alphanumeric electronic message; and transmitting the alphanumeric electronic message with the attached encoded music.

15. The method as claimed in claim 14, wherein the encoding step comprises the step of making pitch changes and duration changes in a single character.

16. A device arranged and adapted to transmit music in an alphanumeric message, the device comprising:

a transmitter arranged to transmit an electronic message with music embedded in the electronic message; and a processor, coupled to said transmitter, for providing the electronic message, the electronic message including characters having a length equal to seven bits, wherein the characters represent notes, note extensions, and commands.

17. The device as claimed in claim 16, wherein the processor is arranged to make pitch changes and duration changes in a single character.

18. The device as claimed in claim 16, wherein the device is one of the group consisting of a pager, a personal digital assistant and a cellular telephone.

19. A device arranged and adapted for receiving music in an alphanumeric message, the device comprising:

a receiver arranged to receive an electronic message with music encoded therein, the electronic message including characters having a length equal to seven bits, wherein the characters represent notes, note extensions, and commands; and a processor operating to decode the electronic message and play the music.

20. The device as claimed in claim 19, wherein the processor is arranged to make pitch changes and duration changes in a single pitch character.

\* \* \* \* \*